(12) United States Patent
Lecoq et al.

(10) Patent No.: US 7,942,382 B2
(45) Date of Patent: May 17, 2011

(54) COMPACT OPTICAL MICROCABLE DRIVER

(75) Inventors: Daniel Lecoq, Berthet (FR); Céline Jevic, Nazaire (FR); Anne-Cécile Reau-Thomas, Pleumeur-Bodou (FR)

(73) Assignee: France Telecom, Paris (FR)

( * ) Notice: Subject to any disclaimer, the term of this patent is extended or adjusted under 35 U.S.C. 154(b) by 726 days.

(21) Appl. No.: 11/630,943

(22) PCT Filed: Jun. 22, 2005

(86) PCT No.: PCT/FR2005/001565
§ 371 (c)(1),
(2), (4) Date: Mar. 21, 2008

(87) PCT Pub. No.: WO2006/010813
PCT Pub. Date: Feb. 2, 2006

(65) Prior Publication Data
US 2008/0267714 A1    Oct. 30, 2008

(30) Foreign Application Priority Data

Jun. 24, 2004   (FR) .................................... 04 06900

(51) Int. Cl.
*G02B 6/50* (2006.01)
*H02G 1/08* (2006.01)

(52) U.S. Cl. ...... 254/134.4; 254/134.3 R; 254/134.3 FT

(58) Field of Classification Search ............ 254/134.3 R, 254/134.4, 134.3 FT
See application file for complete search history.

(56) References Cited

U.S. PATENT DOCUMENTS

| | | | | |
|---|---|---|---|---|
| 4,456,225 | A * | 6/1984 | Lucas ................. | 254/134.3 FT |
| 5,143,353 | A * | 9/1992 | Sano et al. ........... | 254/134.3 FT |
| 5,308,041 | A * | 5/1994 | Griffioen et al. ........... | 254/134.4 |
| 6,170,804 | B1 * | 1/2001 | Allen ......................... | 254/134.4 |
| 6,270,288 | B1 * | 8/2001 | Weidenheft et al. .......... | 405/158 |
| 6,364,290 | B1 * | 4/2002 | Barker ....................... | 254/134.4 |
| 6,561,488 | B1 * | 5/2003 | Walker ....................... | 254/134.4 |
| 2003/0146423 | A1 * | 8/2003 | Griffioen et al. ........... | 254/134.4 |
| 2008/0267714 | A1 * | 10/2008 | Lecoq et al. .................. | 405/184 |

FOREIGN PATENT DOCUMENTS

FR   2 774 777 A1   8/1999
GB   2 388 966 A    11/2003

* cited by examiner

*Primary Examiner* — Lee D Wilson
(74) *Attorney, Agent, or Firm* — Cohen Pontani Lieberman & Pavane LLP

(57) ABSTRACT

The invention relates to an optical cable laying device comprising a mechanism for fixing a rotary motor (i0), at least one friction drive roller (60, 70) for driving the cable (200), and a compressed air inlet (130) for driving the cable (200), the device being characterized in that the motor fixing mechanism, the at least one roller (60, 70) and the compressed air inlet (130) are disposed so that the axis of the motor (10), the compressed air arrival direction (130), and the cable (200) driven by the roller (60, 70) are substantially parallel to one another.

10 Claims, 3 Drawing Sheets

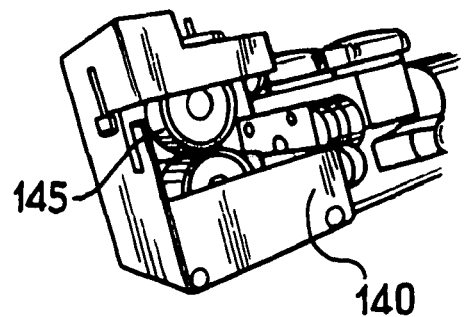
FIG_6
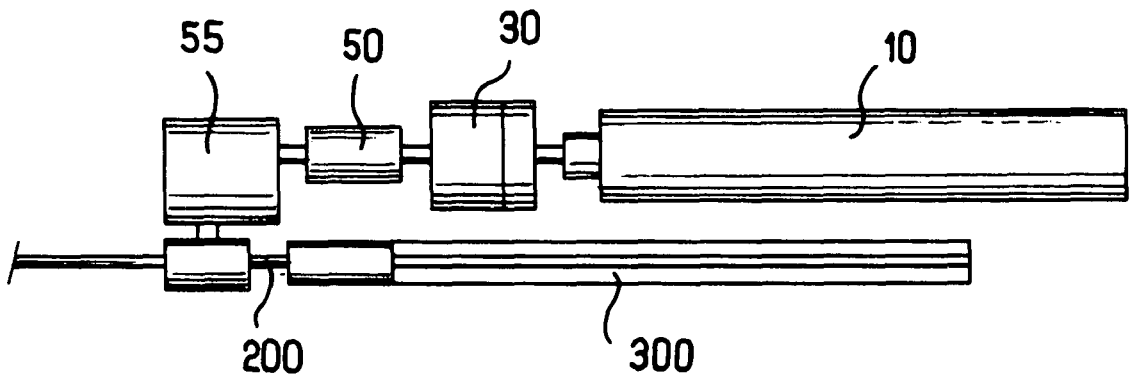
FIG_7
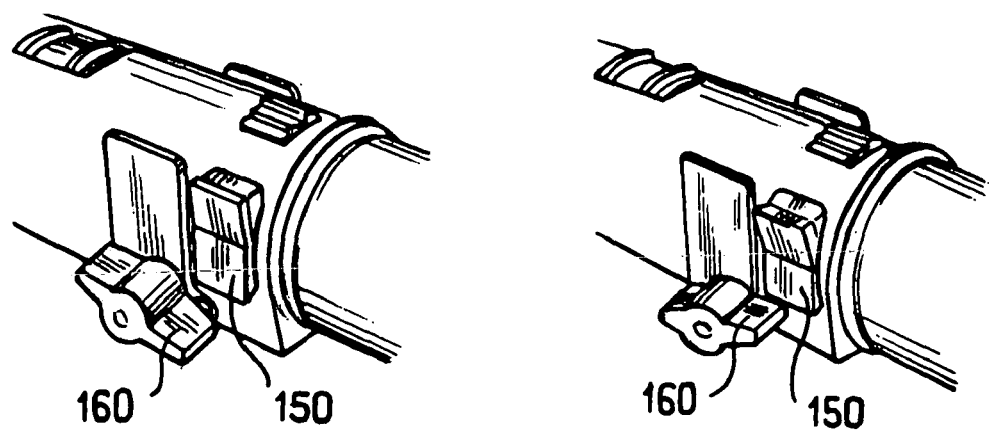
FIG_8 FIG_9

COMPACT OPTICAL MICROCABLE DRIVER

RELATED APPLICATIONS

This is a U.S. National Phase Application under 35 USC 371 of International Application PCT/FR2005/001565, filed on Jun. 22, 2005.

FIELD OF THE INVENTION

The invention relates to optical microcable drivers for use when installing cabling, in particular inside buildings.

Such microcable drivers are applied to blowing, pushing, and/or pulling methods of laying cables. They are equally usable for carrying, rodding, and push-only methods, etc.

BACKGROUND OF THE INVENTION

Two types of laying equipment are available on the market for this type of application, which in particular entails introducing an optical cable into a hollow sheath.

A first type of laying device is based on the air-carrying principle (FIG. 1). Those devices pay out the cable by means of a flow of air.

Pull and blow type laying devices (FIG. 2) pay out the cable by exerting air pressure on a piston at the head end of the cable and by pushing it by means of rotating rollers.

The type of laying device shown in FIG. 1 has already been proposed for installing optical cables of different types, in particular underground, and in service ducts in buildings, but can be used only with difficulty in buildings because the space between the air injection system and the drive rollers makes the device bulky.

In each type of cable laying operation, the cable has a specific diameter and stiffness.

For example, cables laid underground have a greater diameter than cables for use in buildings.

Thus the dimensional and mechanical characteristics of the laying device referred to here are not adapted to laying cables specifically in buildings, where the working spaces are very small.

Installing optical cables in buildings may also necessitate working on the cable ducts of the building, in particular when there is a cascade of these laying devices disposed in series along the cable (FIG. 3). Cascading consists in installing a second in-line cable laying device to enhance cable laying performance when the system is at its limit.

In the device described in the patent FR 2 774 777 the air injection system is on the upstream side of the drive rollers, which are therefore placed in an airtight volume. To cascade them, those devices must be opened up to put the cable into place. When the device is closed again, sealing problems are typically encountered: a seal, a necessity in the case of that device, may not be correctly repositioned in its housing, which creates air leaks.

Moreover, that known type of device, which does not have dimensions particularly suited to its use in buildings, cannot always be installed in cable ducts. Furthermore, that type of device is not simple for the installer to manipulate. In fact, because of its overall size and its weight, that type of device is not easily maneuverable.

SUMMARY OF THE INVENTION

One object of the invention is to provide a device for laying optical cables by a blowing, pulling, or pushing technique that simplifies manipulation, in particular that simplifies inserting the cable between the rollers and into the tube end, without affecting the seal when cascading the device, and that is adapted to laying cables in buildings.

This and other objects are attained in accordance with one aspect of the present invention directed to an optical cable laying device comprising means for fixing a rotary motor, at least one friction drive roller for driving the cable, and a compressed air inlet for driving the cable. The motor fixing means, said at least one roller, and the compressed air inlet are disposed so that the axis of the motor, the compressed air arrival direction, and the cable driven by the roller are substantially parallel to one another other.

BRIEF DESCRIPTION OF THE DRAWINGS

Other features, objects, and advantages of the invention become apparent on reading the following detailed description, which is given with reference to the appended drawings, in which:

FIG. 6 is a detailed view of a laying head of the same device when fitted with its casing;

FIG. 7 is a diagrammatic view of this same variant of the device;

FIGS. 8 and 9 are perspective views of a control unit of the same device in inactive and active positions, respectively.

DETAILED DESCRIPTION OF THE DRAWINGS

Figure 1:
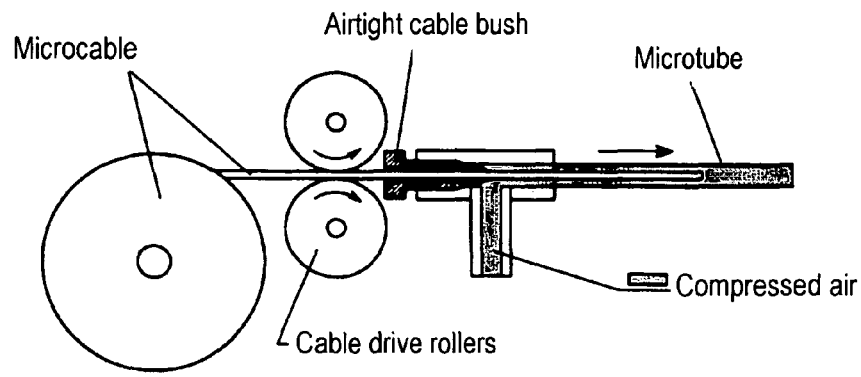
FIG. 1 shows a prior art laying device using the air-carrying technique.
Figure 2:
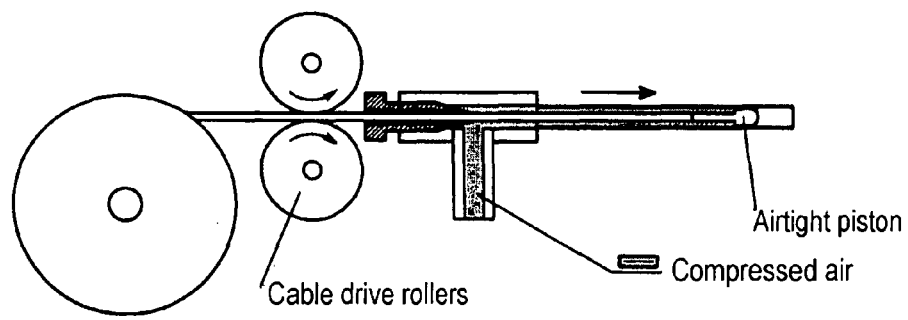
FIG. 2 shows a prior art laying device using the blowing-pulling technique.
Figure 3:
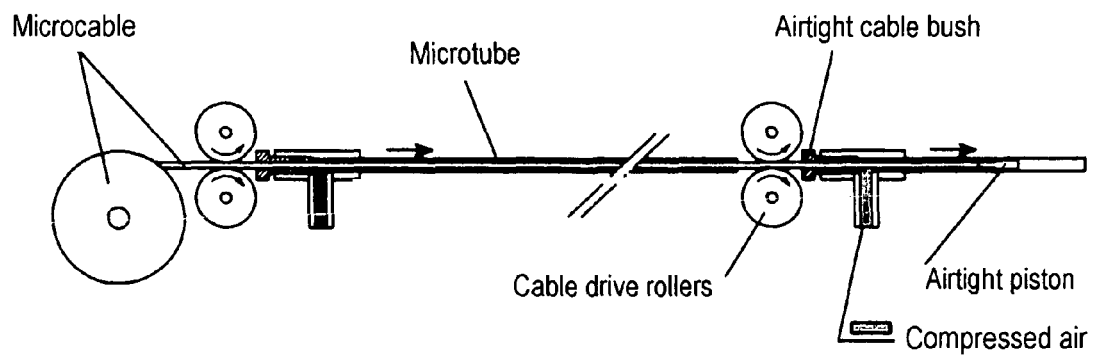
FIG. 3 shows two cascaded prior art devices using the blowing-pulling technique.

The device described here is adapted for use in buildings. It transmits motion to the cable as well as protecting the cable.

The components of the device are designed and selected to make the device as compact as possible.

The cable laying device is also light in weight, facilitating its manipulation and use.

The cable-laying device can therefore be used in cable ducts having small dimensions and/or in cable ducts that are relatively inaccessible.

This example is designed with an electrical power supply from interchangeable batteries and in the form of an ordinary hand tool screwdriver body.

The screwdriver body 10 is retained on a support member 20 of the device that fixes the motor in place, here in the form of a U-shaped member 22 gripping two straight flanks of the screwdriver. This U-shaped member prevents rotation of the screwdriver when it encounters a reaction force from the various members driven in rotation.

In the context of the invention, it should be noted that a screwdriver 10 of the above kind may be replaced by a drill body of the usual kind having a pistol grip. There is also envisaged a variant using a screwdriver with a handle that may be pivoted transversely to the direction of its rotation axis.

The drive system is as follows: motion is transmitted from the screwdriver 10 to the device by a screwdriver bit 12 that is fixed to a torque limiter 30.

The screwdriver bit 12 of the cable laying device enables motion to be transmitted between the power system and the transmission system even if the power system is inclined at a certain angle.

For this purpose the system is provided with an interface 15 between the screwdriver 10 and the torque limiter 30 that consists of an Allen key type tip 16 for transmitting motion with different inclinations of the power system.

A holding member prevents inappropriate movement of the components.

The screwdriver head is therefore of hollow hexagonal shape, corresponding to a socket for an Allen key. The driving head of the torque limiter 30 cooperating with the screwdriver 10 is itself in the form of an Allen key, i.e. of hexagonal section. However, this head has some degree of rounding at its end, i.e. an absence of sharp edges to the hexagonal section, which allows some angular offset between the axis of the screwdriver and the axis of the complementary shaft.

In fact, a rounded head such as the head 16 enables rotary drive to be transmitted despite the lack of strict alignment of the associated two pivoting shafts, namely the driven shaft and the shaft of the screwdriver.

The torque limiter 30 is here of the magnetic powder type, known in itself.

The rotary motion is then transmitted from the torque limiter 30 to an angle transmission module 40, the connection between the two shafts being provided by a coupling member 50.

A roller 60 called the drive roller is fixed to the output shaft of the angle transmission.

A second roller 70 called the pinch and counter roller is positioned against this drive roller 60. The pinch roller 70 is mounted on a compression system 80 and is compressed to the degree set by that system. The corresponding adjustment means are described below.

A device is provided for adjusting the clamping 80 of the rollers 60 and 70, which device is provided with a thumbwheel 91 for adjusting by means of a screw the pressure exerted on the roller 70, which is mobile transversely towards the facing fixed-axis roller 60.

Figure 4:
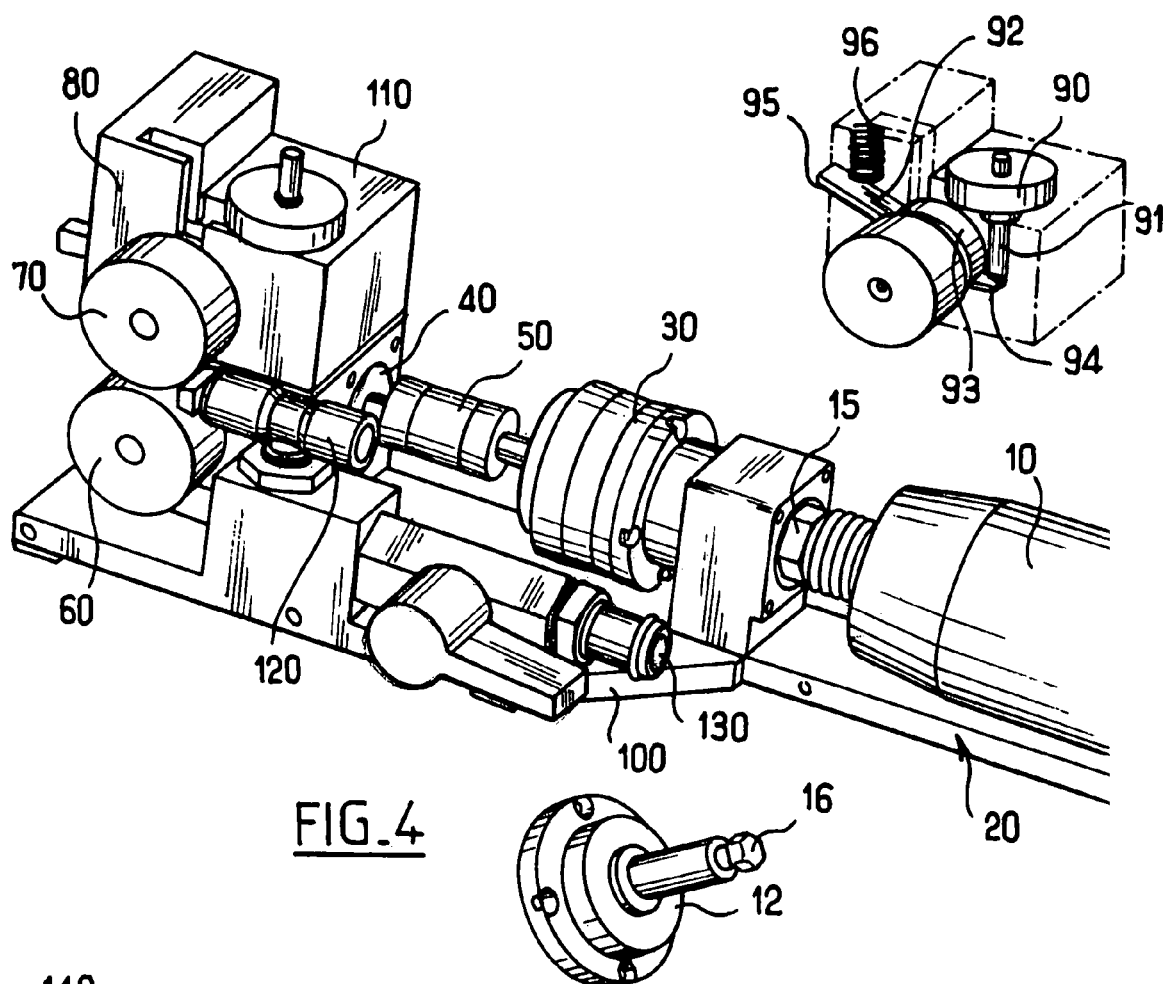
FIG. 4 shows in perspective a head of a laying device in accordance with a first variant of the invention.
Figure 5:
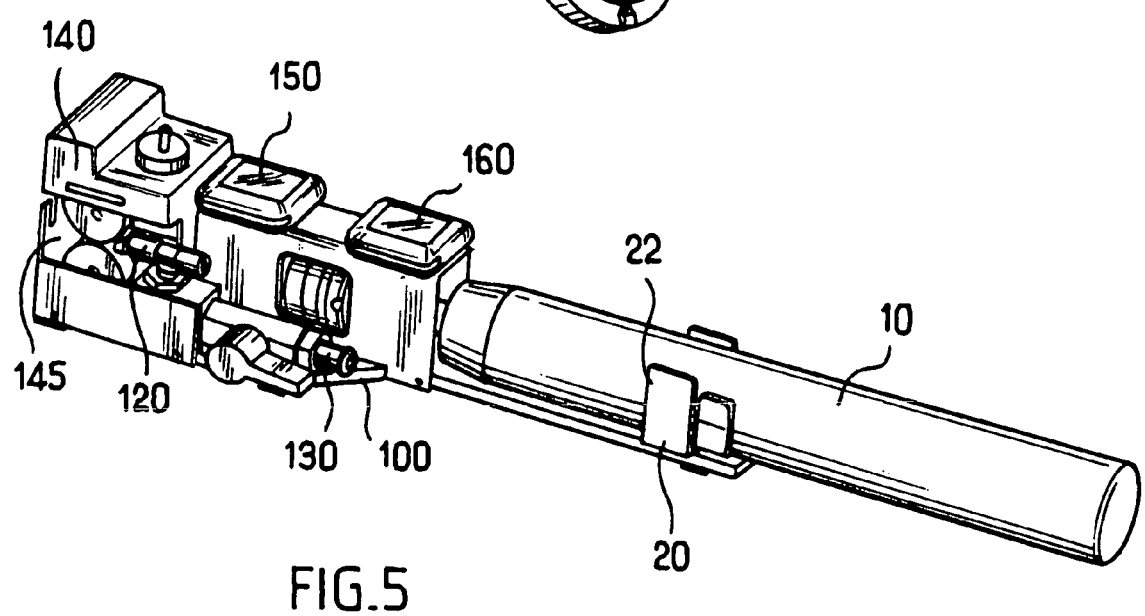
FIG. 5 shows the general arrangement of the same laying device.

This device, shown in FIG. 4 in particular, features a bearing member for pushing the roller 70 towards the facing roller 60. This bearing member takes the form of a lever 92 having a center fulcrum 93 that produces this bearing force, while the ends 94 and 95 of the lever bear on corresponding bearing members situated on opposite sides of the axis of the roller 70.

This duplication of the forces makes it possible to reduce the dimensions of the system components and therefore to achieve a smaller overall size. Thus one of the ends 95 cooperates with a coil spring 96 for pushing the lever toward the cable. The other end of the lever cooperates with the head of the screw adjusted by the above-mentioned thumbwheel 91. Accordingly, the thumbwheel 91 generates a chosen bearing force, but the coil spring 95 nevertheless allows upward movement of the roller 70, in particular when inserting the cable.

This system for adjusting the clamping force is disposed on a module that can be separated from the remainder of the cable laying device. The presence of the coil spring 95 therefore enables the rollers 60 and 70 to be moved to insert the cable without having to operate the thumbwheel 91 and thus without having to interfere with the existing clamping adjustment.

The assembly is retained at diverse places on a support plate 100. A centering system 110 is adapted to position correctly the angle transmission, the compression system, and a pair of shims.

The injection of air is effected by a system fixed onto the support plate 100.

There is provided a compressed air inlet connector 120 in the form of a T-shaped pipe having a vertical stem which is joined perpendicularly the compressed air inlet connector 130. This same vertical stem is mounted so that it can pivot so that the two horizontal branches of the T-shape are able to pivot, in particular from the overall direction of the assembly to a direction perpendicular to the device.

In its perpendicular position, the two horizontal branches of the T-shape, through which the cable passes before entering the tube, do not discharge opposite the rollers 60 and 70 but remain free of any encumbrance at either end. Inserting the cable is therefore much easier with this arrangement, which in particular enables the insertion of a cable pre-equipped with a ferrule, nipple, and piston.

Once the cable has been inserted in this way, the T-connector 120 is pivoted to insert the main portion of the cable between the two rollers 60 and 70 and to insert the piston into the opening of the tube to be equipped with the cable.

This insertion procedure greatly facilitates the installation of the present cable laying device.

These means also enable the installation of the nipple of a pre-equipped cable, the only component not to enter the above-described connector 120, at a position downstream of that connector, before placing the cable between the rollers. In fact, since this connector is particularly close to the rollers, fitting a nipple into this connector would be difficult in the absence of this ability to pivot.

There is advantageously provided on the cable a airtight piston that receives the thrust of the compressed air. A ferrule retains the piston on the head end of the cable.

A nipple plugs the T-connector 120 on the upstream side of the compressed air inlet. A tube that receives the cable is associated with the T-connector directly downstream therefrom.

The cable may equally be inserted into the device without pivoting the T-connector to the perpendicular position. In fact, a simple oblique offset may be sufficient for such insertion before clamping between the rollers and insertion into the tube.

Accordingly, a pivoting air inlet enables the cable to slide easily into the tube. Sliding a cable+piston+ferrule+sealing nipple assembly is possible with this pivoting connector.

A casing 140 protects the device from impact and dust. Counters 150 and 160 are positioned on this casing and measure the length of cable fed and the feed speed. A system for measuring these parameters is mounted on the device and connected to these counters.

A 90° bevel gear type angle transmission 55 enables the cable laying direction to be changed.

This angle transmission 55 enables the device to be positioned in a cable duct.

As shown in FIG. 7, the shaft of the drive motor 10, and thus here the body also, is disposed parallel to the cable 200 and to the tube 300 to receive the cable, so that these longitudinal components, which are therefore parallel to each other, have a minimum overall size.

Moreover, in the present variant, the compressed air inlet 130 is also disposed at the entry of the device in a direction parallel to the axis of the rotary motor. This inlet here takes the form of a hollow insert adapted to receive a flexible pipe.

Accordingly, the portion of the compressed air pipe in the vicinity of the device also extends in the overall direction of the device, thus achieving a minimum overall size.

The alignment of these components 10, 60, 70, and 130 produces a general arrangement of the device enabling it to be placed in the most restricted places.

The support plate 100 provides the mechanical support for all of the above components. The casing 140 allows access to the various components necessary for making the adjustments and for laying the cable.

Thus the device enables direct access to the rollers 60 and 70.

The casing 140 surrounding all of the drive members of this cable laying device is to this end open by virtue of a longitudinal window 145 uncovering the active portions of each of the rollers and in particular the intermediate portion between them.

The device is also easier to use because the rollers are directly accessible (there is no airtight casing).

The device is further equipped with a cable-guide with direct access to the rollers.

This accessibility enables the cable to slide easily between the rollers 60 and 70 in all laying situations. This is an advantage and means that it is no longer necessary to use a pre-equipped cable 200: the piston, ferrule and sealing nipple may be fitted in the factory or before transportation to the site.

The cable laying device may be provided with a system for hooking it onto or into the cable ducts (systems of hooks, magnetic plate). This device may easily be used in cascade.

The system is also provided with a ring that prevents the screwdriver from rotating.

The design of the device further enables the power supply to be locked on during laying so that other operations can be performed simultaneously.

To this end the present device is provided with a locking system requiring no ongoing manual action. In other words, the device is adapted to be placed in an active position and to remain active, leaving the hands of the user free.

The present device being here provided with a manual pushbutton type switch 150, it is provided in the immediate vicinity of this pushbutton with a pivoting member 160 having a moving end that can be placed in two different positions, one offset laterally from the pushbutton 150 and the other bearing on the pushbutton 150. This kind of device is therefore operated after starting the drive motor by moving the retaining member 160 so that it bears directly on the pushbutton 150, which therefore remains depressed.

The device provides in particular a technical solution to simplifying manipulation. In fact, the device is easy to manipulate because of its compact size, low weight and ergonomic design.

The invention claimed is:

1. An optical cable laying device comprising:
   means for fixing a rotary motor (10);
   at least one friction drive roller (60, 70) for driving the cable (200); and
   a compressed air inlet (130) for driving the cable (200),
   wherein the motor fixing means, said at least one roller (60, 70) and the compressed air inlet (130) are disposed so that the axis of the motor (10), the compressed air arrival direction (130), and the cable (200) driven by the roller (60, 70) are substantially parallel to one another.

2. The device according to claim 1, wherein the fixing means (20) for the removable rotary motor (10), which is prevented from rotating when in place, are temporary fixing means.

3. The device according to claim 1 wherein the compressed air inlet (130) consists of a hollow portion (120) adapted to be associated with a compressed air line.

4. The device according to claim 1, wherein the device includes two cable gripping friction rollers (60, 70) and a gripping device associated with at least one of said rollers (60, 70), said gripping device consisting of a lever (92, 93) having a central fulcrum (93) that acts on the shaft of the roller (70) and the two opposite ends that cooperate respectively with a reaction spring member and with an adjustable spacer member (91).

5. The device according to claim 1, wherein the rotary motor (10) is releasably associated with a part driven in rotation (12, 16) by complementary means allowing an angular offset between the motor and said driven part without opposing the transmission of rotation.

6. The device according to claim 5, wherein the rotation transmission means consist of two members nested one within the other, at least one of which members (16) has lateral walls that are rounded in a direction such that said walls diverge and/or converge in the longitudinal direction of the geometrical axis of the member.

7. The device according to claim 1, wherein the device includes a T-shaped compressed air transmission connector (120) having horizontal branches adapted to receive the cable (200) and can be pivoted about the axis consisting of the vertical branch of the T so that, after pivoting, the horizontal branches are free of obstacles impeding insertion of the cable into these horizontal branches.

8. The device according to claim 7, wherein the T-shaped connector (120) is placed directly downstream of said at least one cable drive roller (60, 70) and directly upstream of a location for holding the tube (300) to be equipped with the optical cable (200).

9. The device according to claim 1, wherein the device includes means (160) for locking a manual switch (150) for starting the rotary motor in an operated position.

10. The device according to claim 9, wherein the device includes a power supply pushbutton (150) for the rotary motor, and a movable member (160) adapted, in a first position, to exert a stable pressure on the pushbutton (150) and, in a second position, to be disengaged from said pushbutton (150).

* * * * *